United States Patent
Kim et al.

(10) Patent No.: US 10,852,865 B2
(45) Date of Patent: Dec. 1, 2020

(54) IN-CELL TOUCH TYPE DISPLAY DEVICE

(71) Applicant: LG Display Co., Ltd., Seoul (KR)

(72) Inventors: Kyoung-Wook Kim, Daegu (KR);
Ki-Taeg Shin, Daegu (KR);
Dong-Geun Lim, Namwon-si (KR);
Ji-Won Kang, Gyeryong-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/279,116

(22) Filed: Sep. 28, 2016

(65) Prior Publication Data
US 2017/0090635 A1    Mar. 30, 2017

(30) Foreign Application Priority Data
Sep. 30, 2015   (KR) .................. 10-2015-0137814

(51) Int. Cl.
G06F 3/041      (2006.01)
G06F 3/044      (2006.01)
G02F 1/1362     (2006.01)
G02F 1/1333     (2006.01)
G02F 1/1343     (2006.01)

(52) U.S. Cl.
CPC ........ *G06F 3/0412* (2013.01); *G02F 1/13338* (2013.01); *G02F 1/136286* (2013.01); *G06F 3/044* (2013.01); *G02F 2001/134372* (2013.01); *G06F 2203/04107* (2013.01)

(58) Field of Classification Search
None
See application file for complete search history.

(56) References Cited

U.S. PATENT DOCUMENTS

| | | | |
|---|---|---|---|
| 2010/0194697 A1* | 8/2010 | Hotelling ............. | G06F 3/0412 345/173 |
| 2011/0291977 A1* | 12/2011 | Moriwaki ......... | G02F 1/136286 345/173 |
| 2016/0246408 A1* | 8/2016 | Wang .................. | G02F 1/13338 |
| 2016/0370944 A1* | 12/2016 | Zhao .................... | G06F 3/0412 |

FOREIGN PATENT DOCUMENTS

| | | |
|---|---|---|
| CN | 102341772 A | 2/2012 |
| CN | 103793118 A | 5/2014 |
| CN | 104571768 A | 4/2015 |

OTHER PUBLICATIONS

Office Action dated May 7, 2019 with English translation in the corresponding Chinese Patent Application No. 201610867420.9, 13 Pages.
Chinese Office Action dated Jun. 22, 2020 issued in corresponding Patent Application No. 201610867420.9 w/English Translation (22 pages).

* cited by examiner

*Primary Examiner* — Amare Mengistu
*Assistant Examiner* — Sarvesh J Nadkarni
(74) *Attorney, Agent, or Firm* — Polsinelli PC

(57) ABSTRACT

An in-cell touch type display device includes a touch electrode that is in a display panel and arranged at each touch block, a sensing line that is connected to the touch electrode, and transfers a common voltage during a display period, and at least one dummy line that is connected to the touch electrode, and has a resistance less than that of the touch electrode.

19 Claims, 6 Drawing Sheets

IN-CELL TOUCH TYPE DISPLAY DEVICE

CROSS REFERENCE TO RELATED APPLICATIONS

The present application claims the priority benefit of Korean Patent Application No. 10-2015-0137814 filed in the Republic of Korea on Sep. 30, 2015, which is hereby incorporated by reference in its entirety for all purposes as if fully set forth herein.

BACKGROUND

Field of the Disclosure

The present disclosure relates to an in-cell touch type display device, and more particularly, to an in-cell touch type display device that can improve uniformity of a common voltage in a touch block.

Discussion of the Background

Facing information society, display field of displaying electric information signals has been rapidly advanced, and accordingly, various flat display devices have been developed and used. As flat display devices, such as a liquid crystal display device (LCD), a plasma display panel device (PDP), an organic light emitting diode (OLED) display device and the like have been used.

Among the flat display devices, LCDs are most widely used because they have advantages of small size, light weight, thin profile, low power consumption, and the like.

Recently, a touch function has been added to an LCD. Particularly, to achieve thin profile, an in-cell touch type LCD, in which a touch screen is embedded, has been developed.

In the in-cell touch type LCD, touch blocks arranged in a matrix form in a display region are defined, self-capacitance type touch electrodes are arranged corresponding to respective touch blocks, and sensing lines are connected to the respective touch electrodes. In this configured LCD, a display period and a touch sensing period alternate, and during the touch sensing period, a touch driving signal for a touch sensing is outputted to each sensing line and is applied to the corresponding touch electrode.

Generally, the sensing line is connected approximately to a center portion of the touch electrode, and the touch electrode is made of a transparent conductive material having a high resistance. Accordingly, a common voltage drops from the connection portion to an edge portion of the touch electrode. Thus, there is a deviation of the common voltage from position to position in a touch block, and disuniformity of a common voltage happens. The disuniformity of the common voltage causes a degradation of display quality.

Such disuniformity of the common voltage happens with all sorts of in-cell touch type display devices including LCDs.

SUMMARY

Accordingly, the present disclosure is directed to an in-cell touch type display device that substantially obviates one or more of the problems due to limitations and disadvantages of the related art.

An advantage of the present disclosure is to provide an in-cell touch type display that can improve uniformity of a common voltage in a touch block.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, an in-cell touch type display device includes a touch electrode that is in a display panel and arranged at each touch block, a sensing line that is connected to the touch electrode, and transfers a common voltage during a display period, and at least one dummy line that is connected to the touch electrode, and has a resistance less than that of the touch electrode.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION

Reference will now be made in detail to exemplary embodiments, examples of which are illustrated in the accompanying drawings. The same reference numbers may be used throughout the drawings to refer to the same or like parts.

Figure 1:
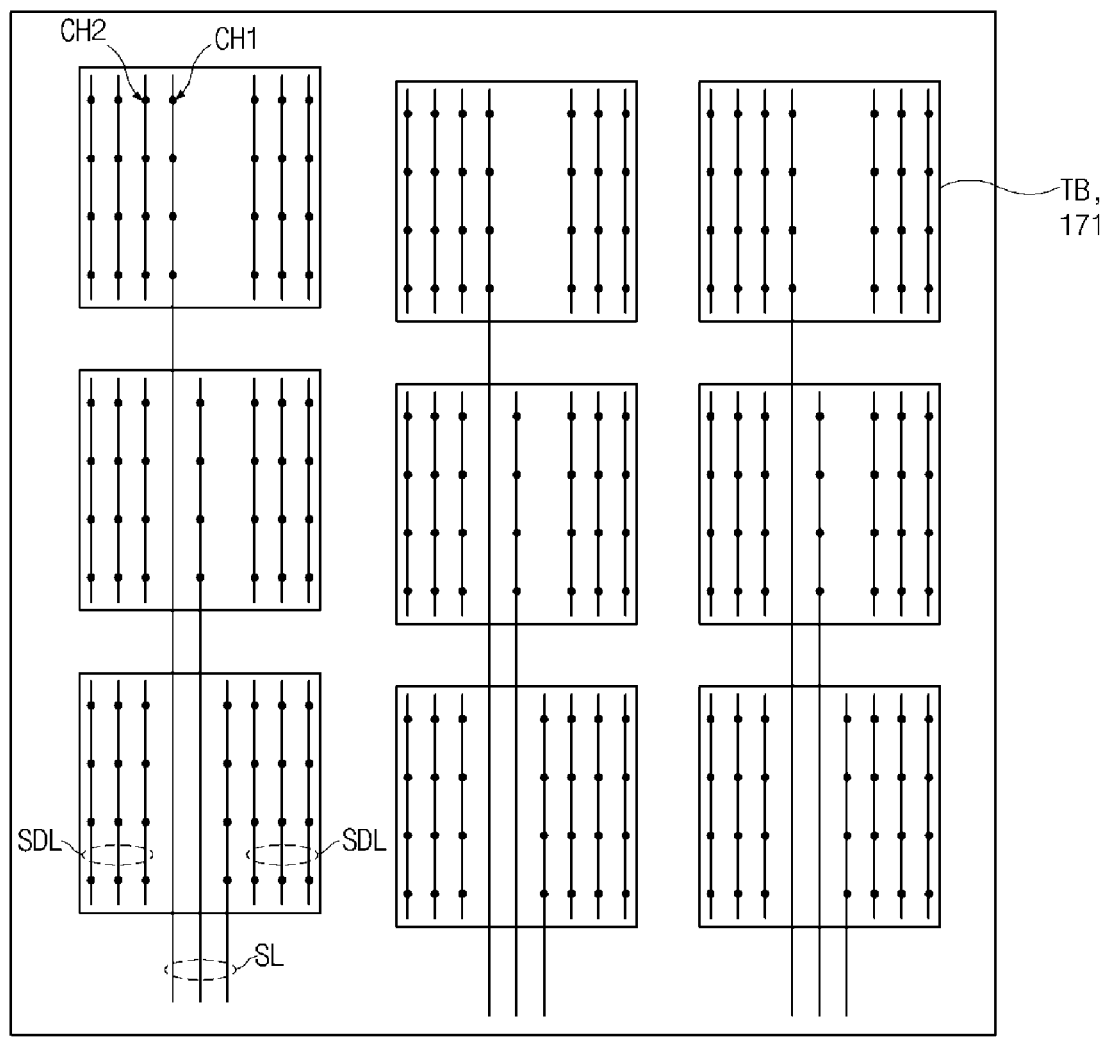
FIG. 1 is a view illustrating an in-cell touch type LCD according to a first embodiment of the present disclosure.

For the purpose of explanations, embodiments of the present disclosure are described with an LCD as a display device by way of example FIG. 1 is a view illustrating an in-cell touch type LCD according to a first embodiment of the present disclosure.

Referring to FIG. 1, the LCD 100 of this embodiment is an in-cell touch type LCD in which a touch electrode 171 as a self-capacitance type touch sensing element is configured.

The LCD 100 includes an array substrate, an opposing substrate, for example, a color filter substrate facing the array substrate, and a liquid crystal layer between the array substrate and the color filter substrate.

The touch electrode 171 may be configured to function as a common electrode, and in this case, the touch electrode 171 (i.e., the common electrode 171) may be formed in the array substrate along with a pixel electrode to operate the liquid crystal layer during a display period to display images. The LCD 100 including the touch electrode 171 may be, for example, an in-plane switching (IPS) mode or an advanced high performance in-plane switching (AH-IPS) mode LCD. In this embodiment, for the purpose of convenience, the AH-IPS mode LCD 100 producing a fringe electric field is described.

The LCD 100 includes a display region displaying images, and in the display region, pixel regions are arranged in a matrix form along rows and columns In the display region, a plurality of touch blocks TB may be arranged in a matrix form along rows and columns Each touch block TB may be configured with a plurality of pixel regions neighboring one another along column and row directions as a group unit for each touch block TB.

In the array substrate of the LCD 100, the touch electrode 171 is formed with the touch block TB as a unit. Each touch electrode 171 formed at each touch block TB is patterned to be separated from and spaced apart from a touch electrode 171 of a neighboring touch block TB. In other words, touch electrodes 171 of touch blocks TB neighboring each other are electrically disconnected from each other.

In the array substrate of the LCD 100, each sensing line SL connected to each touch block TB extends along a direction. For example, the sensing line SL extends along a column direction which is an extension direction of the data line. The sensing line SL is connected to the touch electrode 171 of the corresponding touch block TB through a corresponding first contact hole CH1 and transfers a driving signal to the touch electrode 171.

In this regard, during each frame as a display period, a common voltage is supplied to the sensing line SL and is transferred to the touch electrode 171. Accordingly, in each pixel region of the touch block TB, an electric field between the pixel electrode and the touch electrode 171 is produced to operate a liquid crystal, and thus images are displayed.

During a touch sensing period between neighboring display periods (i.e., during a blank period between neighboring frames), a touch driving signal of a pulse waveform is supplied to the sensing line SL and is transferred to the touch electrode 171. Further, a sensing signal, which corresponds to a changed amount in a capacitance of each tough block TB according to a touch, is detected through the touch electrode 171 and is supplied to the sensing line SL. A user's touch is determined by the detected sensing signal.

As such, the touch electrode 171 formed at the touch block TB functions as the common electrode 171 producing an electric field as well as the electrode sensing the user's touch. Thus, the thin in-cell touch type LCD 100 can be realized.

Further, with respect to each touch block TB, at least one dummy line SDL is spaced apart from and in parallel with the sensing line SL and is connected to the touch electrode 171 through a second contact hole CH2. In other words, the dummy line SDL is formed corresponding to each touch block TB and is connected to each touch block TB, and is spaced apart from a neighboring touch block TB and is patterned to be separated from a dummy line SDL connected to the neighboring touch block TB.

The dummy line SDL may be formed in the same process, of the same material and at the same layer as the sensing line SL. In this case, there is an advantage that an additional mask process to form the dummy line SDL is not required.

The dummy line SDL functions to reduce a resistance of the touch electrode 171, and to do this effectively, the dummy line SDL may be formed of a metal material having a resistance less than that of the touch electrode 171.

In detail, when the dummy line SDL of the less resistance is connected to the touch electrode 171, the touch electrode 171 and the dummy line SDL are electrically connected in parallel with each other. Accordingly, a resistance of the touch electrode 171 combined with the dummy line SDL is less than a resistance of the touch electrode 171 alone. Thus, a voltage drop from a connection portion with the sensing line SL to an edge portion of the touch electrode 171 is reduced, and uniformity of a common voltage can be improved.

Further, a plurality of dummy lines SDL can be used for each touch block TB. In other words, as the number of the dummy lines SDL increases, a reduction of a resistance increases as well. Thus, a plurality of dummy lines SDL within a permissible range can be formed.

In this case, a part of the plurality of dummy lines SDL can be located at one side of the sensing line SL and the other part of the plurality of dummy lines SDL can be located at the other side of the sensing line SL, and the number of the part of the dummy lines SDL and the number of the other part of the dummy lines can be equal.

In this regard, when arranging the dummy lines SDL at both sides of the sensing line SL, a common voltage drop can be reduced at the both sides, and thus a distribution of a common voltage can be more uniform. Further, when the same numbers of the dummy lines SDL are located at both sides of the sensing line SL, a distribution of a common voltage can be much more uniform.

Further, the dummy lines SDL can be arranged symmetrically about a center line of the touch block TB, and in this case, a distribution of a common voltage can be much more uniform.

Further, a plurality of second touch contact holes CH2 are used to connect each dummy line SDL to the touch electrode 171. In this regard, as the number of the second contact holes CH2 increases, a connection area between the dummy line SDL and the touch electrode 171 increases, and the connection area is a substantially effective parameter for a resistance reduction. Accordingly, when the number of the second contact holes CH2 within a permissible range increases, a resistance reduction also increases. Thus, a plurality of second contact holes CH2 within a permissible range can be formed.

Similarly, a plurality of first contact holes CH1 to connect each sensing line SL to the touch electrode 171 can be formed. When a plurality of first contact holes CH1 are formed, a contact resistance between the sensing line SL and the touch electrode 171 is reduced, thus a drop of a common voltage applied from the sensing line SL to the touch electrode 171 is reduced, and thus a common voltage of a desired voltage level can be supplied to the touch electrode 171.

For the purpose of convenience, this embodiment is described with the first contact holes CH1 and the second contact holes CH2 formed of the same number at corresponding positions.

A structure of the array substrate of the LCD 100 is explained with further reference to FIGS. 2 to 5.

Figure 2:
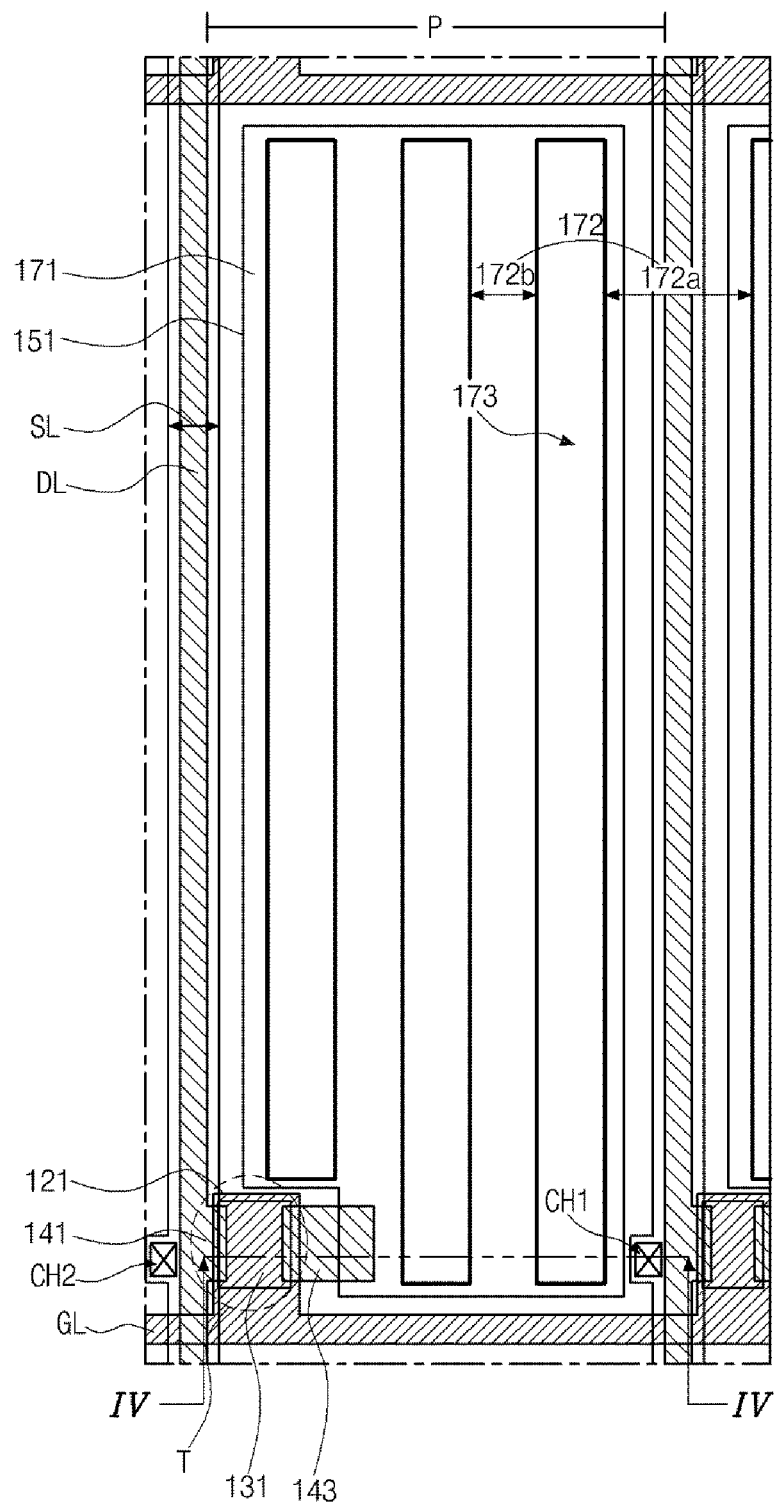
FIG. 2 is a plan view illustrating a portion of a touch block connected to a sensing line in an array substrate of an LCD according to the first embodiment of the present disclosure.
Figure 3:
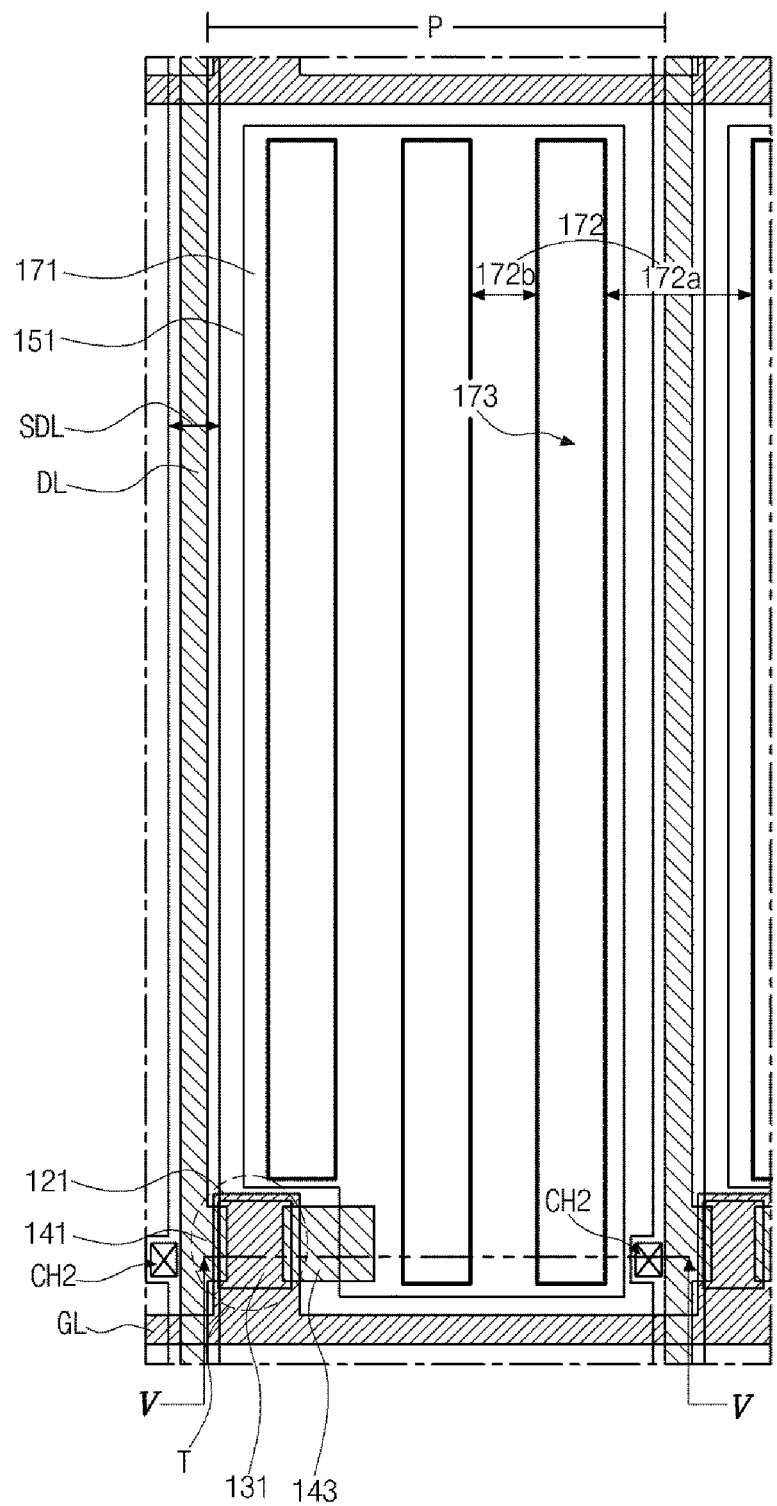
FIG. 3 is a plan view illustrating a portion of a touch block connected to a dummy line in an array substrate of an LCD according to the first embodiment of the present disclosure.
Figure 4:
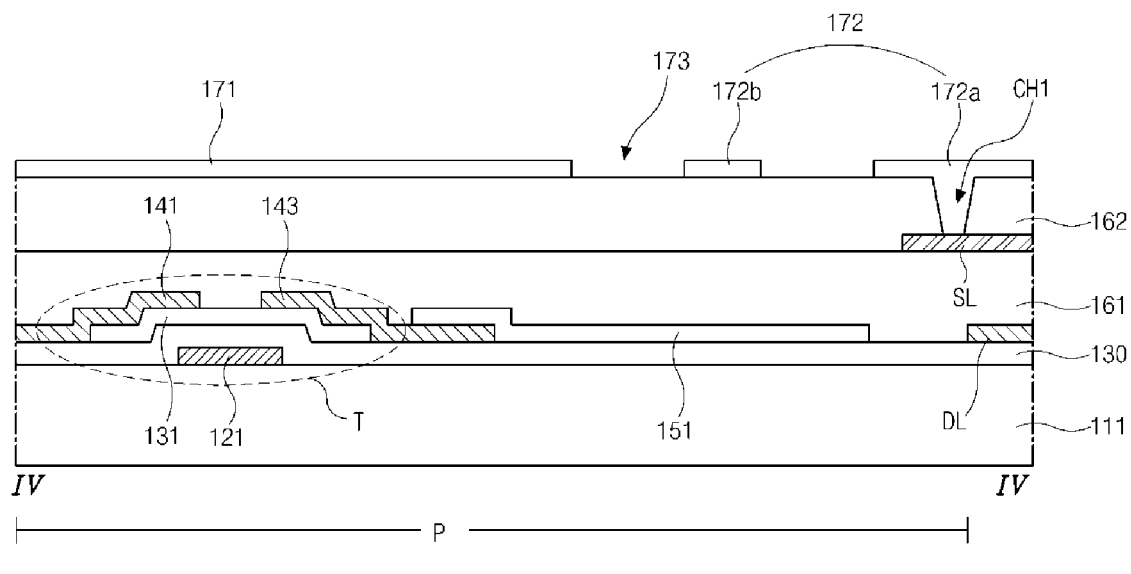
FIG. 4 is a cross-sectional view taken along a line IV-IV of FIG. 2.
Figure 5:
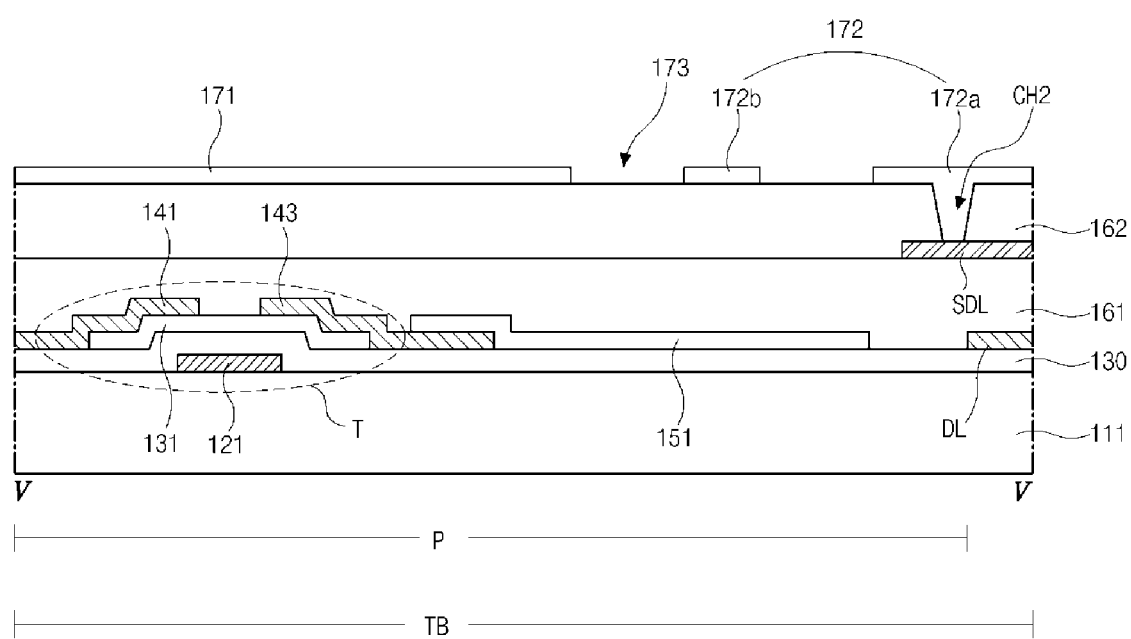
FIG. 5 is a cross-sectional view taken along a line V-V of FIG. 3.

FIG. 2 is a plan view illustrating a portion of a touch block connected to a sensing line in an array substrate of an LCD according to the first embodiment of the present disclosure, FIG. 3 is a plan view illustrating a portion of a touch block connected to a dummy line in an array substrate of an LCD according to the first embodiment of the present disclosure, FIG. 4 is a cross-sectional view taken along a line IV-IV of FIG. 2, and FIG. 5 is a cross-sectional view taken along a line V-V of FIG. 3.

Referring to FIGS. 2 to 5, at the array substrate of the LCD 100, a plurality of gate lines GL extend along a first direction, for example, a row direction on a substrate 111. A gate insulating layer 130 is formed on the gate lines GL. A plurality of data lines DL are formed on the gate insulating layer 130 and extend along a second direction, for example, a column direction.

By the gate lines GL and the data lines DL crossing each other, a plurality of pixel regions P arranged in a matrix form are defined.

In each pixel region P, a thin film transistor T connected to the corresponding gate and data lines GL and DL is formed.

The thin film transistor T includes a gate electrode 121 connected to the gate line GL, a semiconductor layer 131 on the gate insulating layer 130 over the gate electrode 121, and source and drain electrodes 141 and 143 on the semiconductor layer 131 and spaced apart from each other. The source electrode 141 is connected to the data line DL.

In each pixel region P, a pixel electrode 151 connected to the drain electrode 143 is formed.

Each touch electrode 171 i.e., each common electrode 171 is formed at each touch block TB. The common electrode 171 may be arranged over the pixel electrode 151 with at least one insulating layer, for example, first and second passivation layers 161 and 162 therebetween, and generate a fringe electric field with the pixel electrode 151. The common electrode 171 may include a plurality of electrode patterns 172, of a bar shape, that correspond to each pixel region P and face each pixel electrode 171, and an opening 173 may be formed between neighboring electrode patterns 172.

In this case, the electrode patterns 172 may extend along the extension direction of the data line DL. The electrode patterns 172 may include a first electrode pattern 172a that is closer to the data line DL and located at an outermost portion of the pixel region P, and a second electrode pattern 172b that is located at an inner portion of the pixel region P.

The first electrode pattern 172a may be formed, but not limited, with a width greater than the data line DL to shield the data line DL therebelow. Further, the first electrode pattern 172a may be formed, but not limited, with a width greater than the sensing line SL or dummy line SDL overlapping the data line DL to substantially shield the sensing line SL or dummy line SDL therebelow.

When the first electrode pattern 172a is formed above, an electrical interference between the data line DL and the pixel electrode 151, and an electrical interference between the data line DL and the sensing line SL can be prevented.

The second electrode pattern 172b may be formed, but not limited, with a width less than the first electrode pattern 172a In another example regarding the arrangement of the common electrode 171 and the pixel electrode 151, a common electrode 171 at each touch block TB may be formed to have a substantially plate shape, and a pixel electrode 151 may be located over this common electrode 171 with an insulating layer therebetween.

In yet another example, each of the common electrode 171 and the pixel electrode 151 may be formed to have electrode patterns, and such a common electrode 171 and a pixel electrode 151 may be located at the same layer or with an insulating layer therebetween.

The common electrode 171 and the pixel electrode 151 may be formed of a transparent conductive material, for example, ITO, IZO or ITZO.

In the array substrate of the LCD 100, each sensing line SL connected to each touch block TB to transfer a driving signal is formed. The sensing line SL may extend along the extension direction of the data line DL and overlap the data line DL, in the corresponding touch block TB. When the sensing line SL is arranged to overlap the data line DL as a non-display element, reduction of an aperture ratio due to the sensing line SL can be prevented, and also the sensing line SL can be maximized in width and be reduced in resistance. The sensing line SL and the data line DL may be arranged with at least one insulating layer, for example, the first passivation layer 161 therebetween.

The sensing line SL and the common line 171 may be arranged with an insulating layer, for example, the second passivation layer 162 therebetween, and may contact each other through a first contact hole CH1 formed in the second passivation layer 162.

Further, in the array substrate of the LCD 100, at least one dummy line SDL patterned with each touch block TB as a pattern unit and connected to each common electrode 171 is formed. The dummy line SDL may be formed in the same process, at the same layer and of the same material as the sensing line SL.

At each touch block TB, the dummy line SDL may be configured to be spaced apart from the sensing line SL, to extend along the extension direction of the data line DL, and to overlap the data line DL. When the dummy line SDL is arranged to overlap the data line DL as a non-display element, reduction of an aperture ratio due to the dummy line SDL can be prevented, and also the dummy line SDL can be maximized in width and be reduced in resistance.

The dummy line SDL and the data line DL may be arranged with the first passivation layer 161 therebetween. The dummy line SDL and the common line 171 may be arranged with the second passivation layer 162 therebetween, and may contact each other through a second contact hole CH2 formed in the second passivation layer 162.

The sensing line SL and the dummy line SDL may be formed of a metal material having a low resistance, for example, copper (Cu) or aluminum (Al).

The above-configured dummy line SDL functions to reduce a resistance of the touch electrode 171 of the corresponding touch block TB.

In this regard, when the dummy line SDL of the less resistance is connected to the touch electrode 171, the touch electrode 171 and the dummy line SDL are electrically connected in parallel with each other. Accordingly, a resistance of the touch electrode 171 combined with the dummy line SDL is less than a resistance of the touch electrode 171 alone. Thus, a voltage drop from a connection portion with the sensing line SL to an edge portion of the touch electrode 171 is reduced, and uniformity of a common voltage can be improved.

Further, a plurality of dummy lines SDL can be used for each touch block TB, and in this case, a reduction of a resistance of the touch electrode 171 increases, and uniformity of a common voltage can be improved.

In this case, a part of the plurality of dummy lines SDL can be located at one side of the sensing line SL and the other part of the plurality of dummy lines SDL can be located at the other side of the sensing line SL. In addition, the number of the part of the dummy lines SDL and the number of the other part of the dummy lines can be equal. A common voltage drop can be reduced at the both sides, and thus a distribution of a common voltage can be more uniform. Further, the dummy lines SDL can be arranged symmetrically about a center of the touch block TB, and in this case, a distribution of a common voltage can be much more uniform.

Further, a plurality of second touch contact holes CH2 can be used to connect each dummy line SDL to the touch electrode 171, and in this case, a connection area between the dummy line SDL and the touch electrode 171 increases, and a resistance reduction also increases.

Similarly, forming a plurality of first contact holes CH1 to connect each sensing line SL to the touch electrode 171 is preferable. In this case, a drop of a common voltage applied from the sensing line SL to the touch electrode 171 is reduced, and thus a common voltage of a desired voltage level can be supplied to the touch electrode 171.

Another embodiment that further reduces a resistance of the touch electrode 171 connected to the dummy line SDL and can further improve a uniformity of a common voltage at the touch block TB is explained below.

Figure 6:
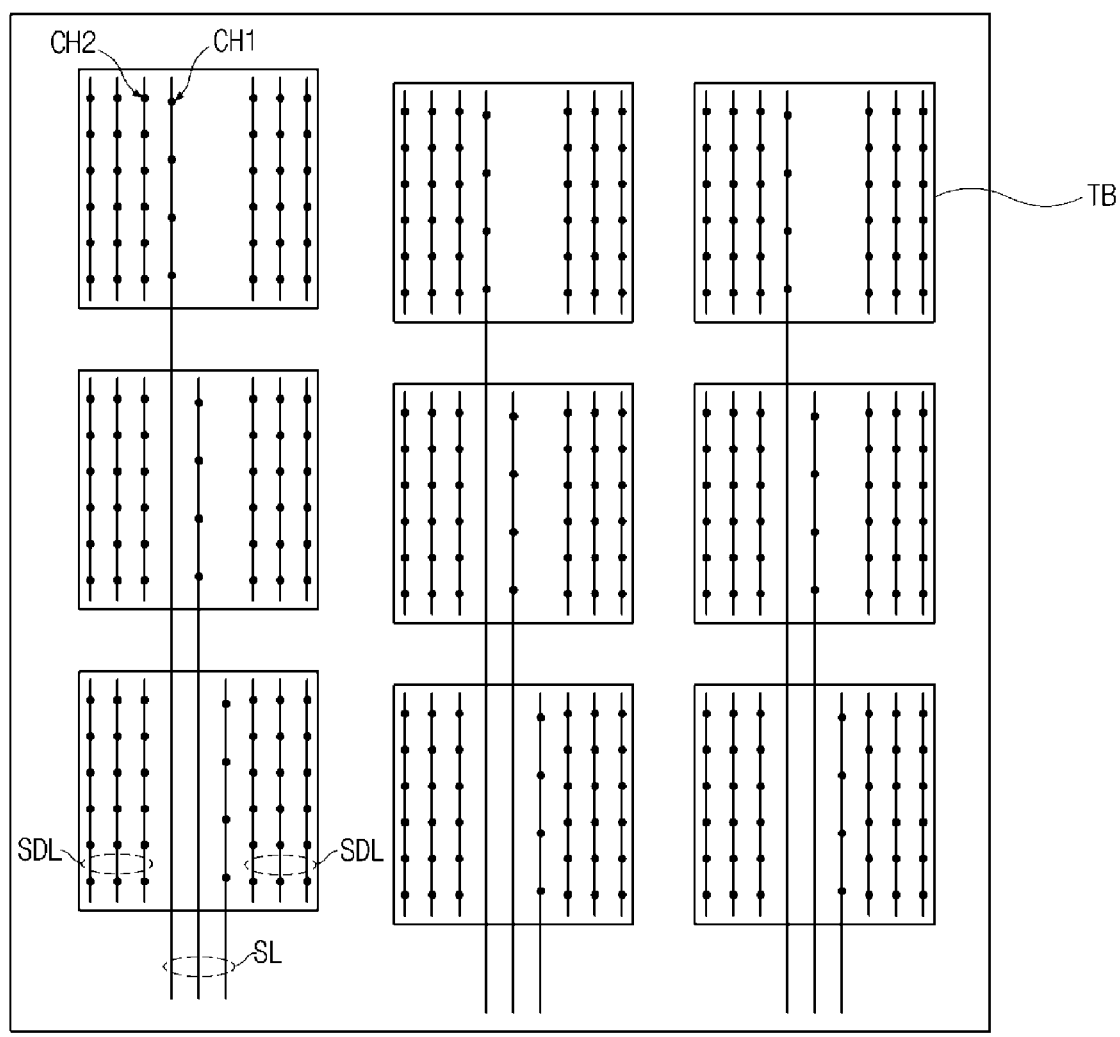
FIG. 6 is a view illustrating an in-cell touch type LCD according to a second embodiment of the present disclosure.

FIG. 6 is a view illustrating an in-cell touch type LCD according to a second embodiment of the present disclosure. Explanations of parts similar to parts of the first embodiment may be omitted.

Referring to FIG. 6, in the LCD 100 of the second embodiment, the number of second contact holes CH2 is greater than the number of first contact holes CH1.

In this configuration, a contact area of the dummy line SDL with the touch electrode 171 increases, compared with the first embodiment. The contact area is a substantially effective parameter for a resistance reduction.

Accordingly, a resistance reduction of the touch electrode 171 combined with the dummy line SDL increases, and a distribution of a common voltage at the touch block TB can be more uniform.

Figure 7:
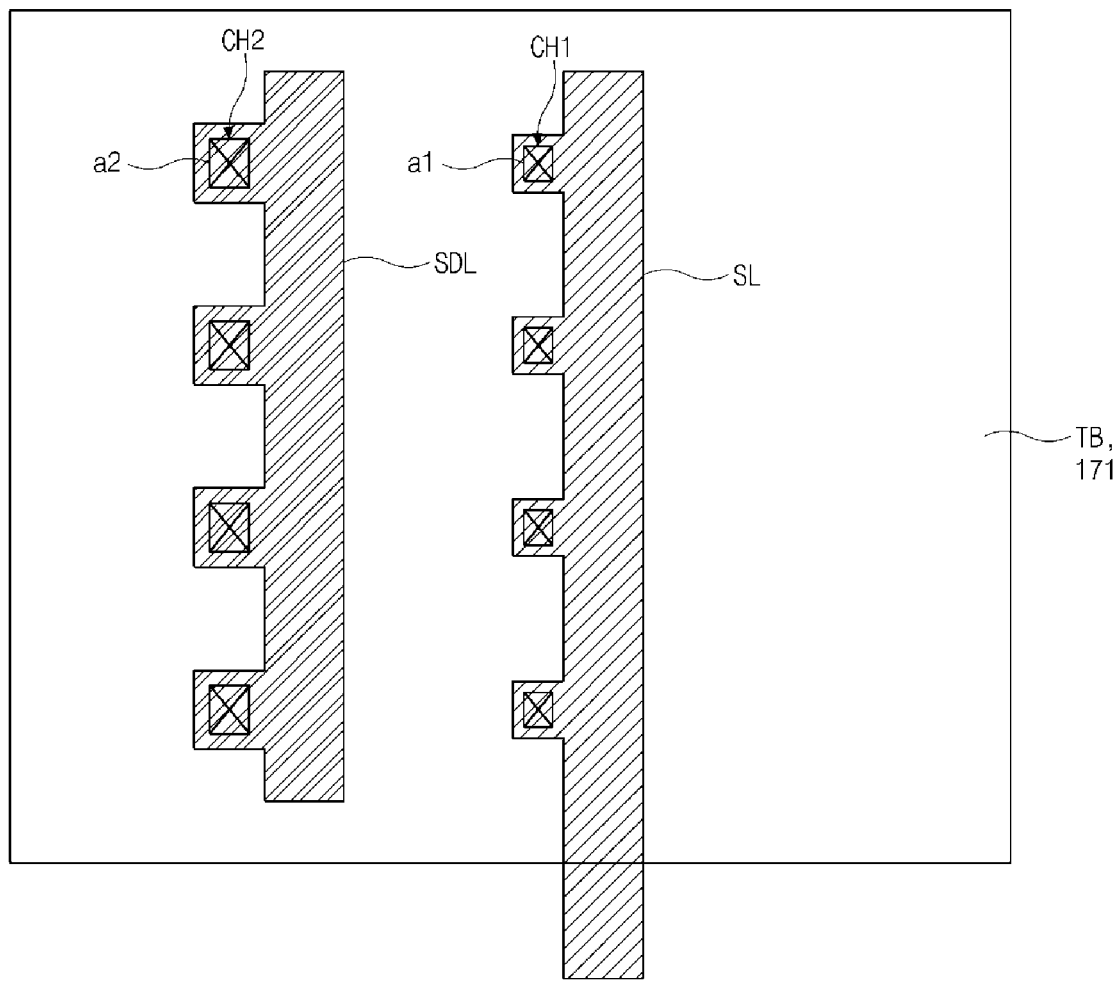
FIG. 7 is a view illustrating a touch block of an in-cell touch type LCD according to a third embodiment of the present disclosure.

FIG. 7 is a view illustrating a touch block of an in-cell touch type LCD according to a third embodiment of the present disclosure. For the purpose of convenience, FIG. 7 schematically describes a sensing line and a dummy line connected to a touch block. Explanations of parts similar to parts of the first and second embodiments may be omitted.

Referring to FIG. 7, in the LCD of the third embodiment, an area a2 of the second contact hole CH2 exposing the dummy line SDL connected to the touch block TB is greater than an area a1 of the first contact hole CH1.

In this configuration, a contact area of the dummy line SDL with the touch electrode 171 increases, compared with the first embodiment.

Accordingly, a resistance reduction of the touch electrode 171 combined with the dummy line SDL increases, and a distribution of a common voltage at the touch block TB can be more uniform.

In the above second and third embodiments, by increasing the contact area with the touch electrode 171, a distribution of a common voltage at the touch block TB can be much more uniform.

The second embodiment and the third embodiment may be combined, and in this case, the contact area of the dummy line SDL more increases, a distribution of a common voltage at the touch block TB can be much more uniform.

As described above, at each touch block TB, the dummy line of the less resistance is connected to the touch electrode 171. Accordingly, a resistance of the touch electrode combined with the dummy line is less than a resistance of the touch electrode alone. Thus, a voltage drop from a connection portion with the sensing line to an edge portion of the touch electrode is reduced, and uniformity of a common voltage can be improved.

It should be understood that the above embodiments can be applied to all sorts of display devices including an LCD.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. An in-cell touch type display device having a display panel, comprising:
a plurality of touch electrodes disposed at an array substrate and respectively formed at a plurality of touch blocks arranged in row and column directions of the display panel and separated and spaced apart from one another;
a plurality of sensing lines extending along the column direction and electrically connected to the plurality of touch electrodes, respectively, and transferring a common voltage to the plurality of touch electrodes, respectively, during a display period, each sensing line contacting each touch electrode;
at least one dummy line disposed at each touch block, the at least one dummy line being spaced apart from and in parallel with the sensing line contacting each touch electrode and connected to each touch electrode, and having an electrical resistance lower than that of each touch electrode at each touch block, wherein each dummy line disposed at each touch block is not connected with other dummy lines disposed at other touch blocks; and
an insulating layer having first contact holes to connect each sensing line and each touch electrode, and second contact holes to connect each dummy line and each touch electrode,
wherein a number of the second contact holes are greater than a number of the first contact holes.

2. The device of claim 1, wherein the at least one dummy line includes a plurality of dummy lines that are arranged at both sides of the sensing line.

3. The device of claim 2, wherein a number of the dummy lines on the both sides of the sensing line is the same.

4. The device of claim 2, wherein the dummy lines are symmetrically disposed on both side of the sensing line.

5. The device of claim 1, wherein the display panel includes the array substrate having the touch electrode, wherein the at least one dummy line and the sensing line are located at the same layer and made of the same material.

6. The device of claim 5, wherein the array substrate includes a pixel electrode at a pixel region of the array substrate and corresponding to the touch electrode.

7. The device of claim 1, wherein the at least one dummy line and the touch electrode are electrically in a parallel connection.

8. The device of claim 7, wherein a combined resistance between the touch electrode and the at least on dummy line is lower than a resistance of the touch electrode alone.

9. The device of claim 8, wherein a voltage drop is reduced from a connection portion with the sensing line to an edge portion of the touch electrode.

10. The device of claim 1, wherein the touch electrode is configured to function as a common electrode.

11. An in-cell touch type display device having a display panel, comprising:
- a plurality of touch electrodes disposed at an array substrate and respectively formed at a plurality of touch blocks arranged in row and column directions of the display panel and separated and spaced apart from one another;
- a plurality of sensing lines extending along the column direction and electrically connected to the plurality of touch electrodes, respectively, and transferring a common voltage to the plurality of touch electrodes, respectively, during a display period, each sensing line contacting each touch electrode;
- at least one dummy line disposed at each touch block, the at least one dummy line being spaced apart from and in parallel with the sensing line contacting each touch electrode and connected to each touch electrode, and having an electrical resistance lower than that of each touch electrode at each touch block, wherein each dummy line disposed at each touch block is not connected with other dummy lines disposed at other touch blocks; and
- an insulating layer having first contact holes to connect each sensing line and each touch electrode, and second contact holes to connect each dummy line and each touch electrode,
- wherein each second contact hole has an area greater than that of each first contact hole.

12. An in-cell touch type display device having a display panel, comprising:
- a plurality of touch electrodes disposed at an array substrate and respectively formed at a plurality of touch blocks arranged in row and column directions of the display panel and separated and spaced apart from one another;
- a plurality of sensing lines extending along the column direction and electrically connected to the plurality of touch electrodes, respectively, and transferring a common voltage to the plurality of touch electrodes, respectively, during a display period, each sensing line contacting each touch electrode;
- at least one dummy line that is disposed at each touch block, the at least one dummy line being spaced apart from and in parallel with the sensing line contacting each touch electrode and connected to each touch electrode, and having and electrical resistance lower than that of each touch electrode at each touch block, wherein the at least one dummy line and the touch electrode are electrically in a parallel connection, so that a combined resistance between the touch electrode and the at least on dummy line is lower than an electrical resistance of the touch electrode alone, and wherein each dummy line disposed at each touch block is not connected with other dummy lines disposed at other touch blocks; and
- an insulating layer having first contact holes to connect each sensing line and each touch electrode, and second contact holes to connect each dummy line and each touch electrode, wherein a number of the second contact holes are greater than a number of the first contact holes.

13. The device of claim 12, wherein the at least one dummy line is disposed with a same number on both sides of the sensing line.

14. The device of claim 12, wherein the at least one dummy line is symmetrically disposed on both sides of the sensing line.

15. An in-cell touch type display device having a display panel, comprising:
- a plurality of touch electrodes disposed at an array substrate and respectively formed at a plurality of touch blocks arranged in row and column directions of the display panel and separated and spaced apart from one another;
- a plurality of sensing line extending along the column direction and electrically connected to the plurality of touch electrodes, respectively, and transferring a common voltage to the plurality of touch electrodes, respectively, during a display period, each sensing line contacting a first portion of each touch electrode;
- a plurality of dummy lines disposed at each touch block, the plurality of dummy lines being spaced apart from and in parallel with the sensing line contacting each touch electrode and connected to each touch electrode, and having an electrical resistance lower than that of each touch electrode at each touch block, wherein the plurality of dummy lines are formed of a same material as the plurality of sensing lines, and each of the plurality of dummy lines disposed on each touch block is not connected with other dummy lines disposed at other touch blocks; and
- an insulating layer having first contact holes to connect each sensing line and each touch electrode, and second contact holes to connect each dummy line and each touch electrode,
- wherein a number of the second contact holes are greater than a number of the first contact holes.

16. The device of claim 15, wherein the sensing line is disposed between the plurality of dummy lines.

17. The device of claim 16, wherein the plurality of dummy lines is symmetrically disposed on both sides of the sensing line.

18. An in-cell touch type display device having a display panel, comprising:
- a plurality of touch electrodes disposed at an array substrate and respectively formed at a plurality of touch blocks arranged in row and column directions of the display panel and separated and spaced apart from one another;
- a plurality of sensing line extending along the column direction and electrically connected to the plurality of touch electrodes, respectively, and transferring a common voltage to the plurality of touch electrodes, respectively, during a display period, each sensing line contacting each touch electrode;
- a plurality of dummy lines disposed at each touch block, the plurality of dummy lines being spaced apart from and in parallel with the sensing line contacting each touch electrode and connected to each touch electrode, and having an electrical resistance lower than that of each touch electrode at each touch block, wherein the plurality of dummy lines are formed of a same material as the plurality of sensing lines, and each of the plurality of dummy lines disposed on each touch block is not connected with other dummy lines disposed at other touch blocks; and
- an insulating layer having first contact holes to connect each sensing line and each touch electrode, and second contact holes to connect each dummy line and each touch electrode, wherein each second contact hole has an area greater than that of each first contact hole.

19. An in-cell touch type display device having a display panel, comprising:
- a plurality of touch electrodes disposed at an array substrate and respectively formed at a plurality of touch blocks arranged in row and column directions of the display panel and separated and spaced apart from one another;
- a plurality of sensing lines extending along the column direction and electrically connected to the plurality of touch electrodes, respectively, and transferring a common voltage to the plurality of touch electrodes, respectively, during a display period, each sensing line contacting each touch electrode;
- at least one dummy line that is disposed at each touch block, the at least one dummy line being spaced apart from and in parallel with the sensing line contacting each touch electrode and connected to each touch electrode, and having and electrical resistance lower than that of each touch electrode at each touch block, wherein the at least one dummy line and the touch electrode are electrically in a parallel connection, so that a combined resistance between the touch electrode and the at least on dummy line is lower than an electrical resistance of the touch electrode alone, and wherein each dummy line disposed at each touch block is not connected with other dummy lines disposed at other touch blocks; and
- an insulating layer having first contact holes to connect each sensing line and each touch electrode, and second contact holes to connect each dummy line and each touch electrode, wherein each second contact hole has an area greater than that of each first contact hole.

* * * * *